United States Patent [19]
Alpert

[11] Patent Number: 6,000,389
[45] Date of Patent: Dec. 14, 1999

[54] GRILL

[76] Inventor: Gerald Alpert, One Nancy Ct., Huntington, N.Y. 11743

[21] Appl. No.: 09/290,533

[22] Filed: Apr. 12, 1999

[51] Int. Cl.[6] .............................. A47J 37/00; A47J 37/08
[52] U.S. Cl. ...................... 126/25 R; 126/41 R; 99/447; 99/401
[58] Field of Search .............................. 126/41 R, 25 R, 126/25 A, 39 R, 41 D, 41 E, 25 B, 41 A, 50; 99/447, 443, 446, 421 HV, 401

[56] References Cited

U.S. PATENT DOCUMENTS

| | | | |
|---|---|---|---|
| 1,010,169 | 11/1911 | Noreck | 126/41 E |
| 2,355,230 | 8/1944 | Moecker, Jr. et al. | 126/41 R |
| 3,871,355 | 3/1975 | Henry | 126/512 |
| 4,643,162 | 2/1987 | Collins | 126/41 R |
| 4,852,476 | 8/1989 | Sanchez | 99/443 R |
| 5,473,980 | 12/1995 | Carpenter | 99/446 |
| 5,878,739 | 3/1999 | Guidry | 126/25 R |

*Primary Examiner*—Larry Jones
*Attorney, Agent, or Firm*—Bauer & Schaffer, LLP

[57] ABSTRACT

A combination gas and charcoal grill that includes a housing, a heat distribution element, a gas burner, and an ash pan drawer. The heat distribution element is disposed in the housing for supporting one of lava rocks and ceramic briquettes when the combination gas and charcoal grill is being used as a gas grill and for supporting charcoal briquettes when the combination gas and charcoal grill is being used as a charcoal grill. The gas burner is disposed in the housing for heating the one of the lava rocks and the ceramic briquettes when the combination gas and charcoal grill is being used as the gas grill and for initially igniting the charcoal briquettes when the combination gas and charcoal grill is being used as the charcoal grill. The ash pan drawer is replaceably mounted in the housing and is removed for heating the one of the lava rocks and the ceramic briquettes and for initially igniting the charcoal briquettes and being returned after charcoal ignition for collecting ashes generated by the charcoal briquettes and food drippings when the combination gas and charcoal grill is being used as the charcoal grill. The combination grill further providing the ease of front-panel loading of lava rocks or charcoal and the venting of heat generated by such heating medium.

27 Claims, 7 Drawing Sheets

Method of utilizing the combination gas and charcoal grill (10, 110, 210) for cooking food using either the lava rocks (16) or the ceramic briquettes (18) as a heat source

*Fig. 6*

GRILL

BACKGROUND OF THE INVENTION

1. Field of the Invention

The present invention relates to a grill. More particularly, the present invention relates to a combination gas and charcoal grill.

2. Description of the Prior Art

Grilling food on a barbecue grill can normally be accomplished in one of two ways. A typical charcoal grill utilizes charcoal briquettes which are ignited with lighter fluid. The briquettes are then left to burn until the entire charcoal is heated through and glowing, at which time the grill is normally ready for use. As the charcoal is consumed, ash is formed and falls to the bottom of the grill where it is periodically removed.

The second type of grill is gas-fired which normally utilizes two burners that are fueled with natural or propane gas and ignited. A radiant material, such as lava rock, disposed above the burners or element, normally on a steel grate, absorbs heat from the gas flame and conducts it to the food to be cooked thereabove.

These systems are, for the most part, mutually exclusive in that regular charcoal cannot be used in a gas grill due to problems with ash clogging the burners, and radiant material used in gas grills is not designed for or capable of sustained burning as is normal charcoal. Each system, however, has its particular advantages and/or disadvantages. Grilling with normal charcoal imparts a smoked flavor to foods cooked thereover, however, it is a relatively slow procedure from ignition to actual cooking. Cooking on a gas-fired unit is generally faster, however, the smoked flavor imparted by charcoal is normally not obtained from the inert radiant material.

Thus, a choice must normally be made, either to buy two grills, one of each type, or to forego the advantages of one type in favor of the other. Many other considerations are also present including space requirements, expense, safety factors, and personal preference.

The present invention provides for either method of cooking using a single appliance or unit wherein the chef is given the choice of using either a charcoal method of cooking or a natural/propane gas and lava rock method of cooking, as more specifically described herein, with additional advantages consisting in safety features, easy maintenance, clean up, reduced cost and convenience of operation.

Numerous innovations for grills have been provided in the prior art. Even though these innovations may be suitable for the specific individual purposes to which they address, however, they differ from the present invention.

FOR EXAMPLE, U.S. Pat. No. 3,295,509 to Harvey teaches a gas burner apparatus for use in a firebox. The apparatus comprising a pair of spaced parallel support bars, a spreader bar extending between the support bars to maintain the spacing therebetween, the ends of the support bars lying in a plane and formed to be supported to dispose the plane in parallel closely spaced relation above the bottom of the firebox, a burner assembly supported to extend between the support bars, the burner comprising an elongated vane lying generally in a plane tipped at a modest angle to the horizontal and disposing one side edge above the other, the side edges extending transversely of the support bars, a series of burn holes in a line along the upper edge of the vane and beneath the plane of the vane for discharging gas to be burned thereat, an elongated gas manifold extending along the upper side edge of the vane and in gas communication with the burn holes to supply same with a mixture of air and fuel gas, means for mixing air and fuel gas and for feeding the mixture to the manifold, and a valve means disposed to control the flow of fuel gas to the mixing means, the angle of the plane of the vane and the adjacency of the lower side edge thereof with respect to the bottom of the firebox serving to cause air to be drawn upwardly beneath the vane toward the burn holes when the burner is ignited.

ANOTHER EXAMPLE, U.S. Pat. No. 3,500,812 to Korngold teaches a covered barbecue stove. The stove includes a base shell and a cover shell which are separately joined together at an upwardly facing flange formed on the base shell so that the cover shell fits inside the flange and drippings drip into the base shell instead of onto the outside of the structure. The cover shell includes a flue on its central axis with exhaust gas control means in it, and the base shell includes a port to which an ash pan is removably fitted to catch ashes therein. Air inlet control means is provided in the base shell. Food support means and fuel supply means are also provided inside the base shell.

STILL ANOTHER EXAMPLE, U.S. Pat. No. 3,699,876 to Ellis teaches a common casing that encloses an ash pit and grate for a pit-type barbecue cooker and an overhead pan for drippings or for the support of charcoal when the device is utilized as an outdoor charcoal grill. An adjustable grill rack is mounted in the casing above the pan and an adjustable stack with damper in the top of the casing allows smoke from a wood fire to be circulated across food on the grill rack.

YET ANOTHER EXAMPLE, U.S. Pat. No. 4,706,643 to Tyson teaches a grill of the type ordinarily associated with charcoal. Such grill features sloped heat reflecting sides which create smoke but will not flame up, an elongated thin, centrally disposed charcoal basket is also provided with a clean out tray therebelow. Additionally, a charcoal igniting chamber is provided which allows the charcoal to be lit through the use of newspaper type combustibles thus eliminating the need for charcoal lighter fluid and similar ignitors.

STILL YET ANOTHER EXAMPLE, U.S. Pat. No. 4,819,614 to Hitch teaches a barbecue grill assembly having a dual mode of operation for cooking with charcoal briquettes or with a burner element. The firebox of the grill includes a burner element near the floor thereof and an aperture in one of the sidewalls for receiving a tray member. The tray member has channels for receiving charcoal to be ignited by the gas burner and which, in its 180° inverted position, acts as a shield for the burner. Positive locking is accomplished with spring-clips and by bimetallic lever arms which lock the tray in the tracks when heated.

YET STILL ANOTHER EXAMPLE, U.S. Pat. No. 4,903,683 to Larsen et al. teaches a system, including apparatus and methods, which facilitates the use of dutch ovens, usually combined with a charcoal heating source, in outdoor cooking. The first apparatus is a safe, independent, time-efficient device which quickly preheats charcoal briquettes contained in a portable hopper, accomplishing the same by means of a self-contained, transportable, propane-fueled burner. A second apparatus is a sturdy, portable cooking stand, which, in the "as used" position, provides a safe, elevated site whereupon the charcoal heating source and a plurality of dutch ovens can be conveniently placed for cooking purposes, and which, in the "as transported" position, is disassembled and may be carried facilely to more desired locations. The third apparatus is a T-handled dutch oven and dutch oven lid lifting device whereby the ovens and/or lids may be conveniently and safely removed from and replaced on the heating source.

STILL YET ANOTHER EXAMPLE, U.S. Pat. No. 5,086, 752 to Hait teaches an outdoor cooking unit in which a pedestal stand supports above the ground a firebox with an inverted, truncated pyramidal configuration. Disposed within the firebox is a fire grate. A cooking grill is disposed above the fire grate. The pedestal stand includes a pillar having an inverted, truncated pyramidal configuration. The firebox is supported by the pillar of the pedestal stand.

YET STILL ANOTHER EXAMPLE, U.S. Pat. No. 5,168, 796 to Porton et al. teaches a combination table and cooking grill comprising a substantially horizontal table top having a centrally disposed aperture formed therethrough with a table support surface formed about the periphery thereof mounted on the upper portion of a substantially vertical hollow pedestal, an inner grill housing to operatively house a heat source therein and a cooking grate disposed in operative alignment with the heat source and the centrally disposed aperture such that persons around the periphery of the substantially horizontal table top can cook on the cooking grate as well as place food, drinks, condiments and the like on the table support surface.

STILL YET ANOTHER EXAMPLE, U.S. Pat. No. 5,213, 075 to Stephen et al. teaches a gas burner for a charcoal grill having a bowl and includes an elongated burner tube secured to the bowl and passed through an opening in the bowl so as to be positioned in a substantially horizontal manner below and substantially parallel to a bed of charcoal supported on a charcoal support grid. The burner has a propane tank connected to the free end thereof outside the bowl and has air intake openings in the tube adjacent the free end. A venturi section is formed into the tube downstream of the air intake openings and elongated diametrically-opposed, horizontal slots defining the gas exit ports are positioned downstream of the venturi section. An ignitor assembly having its electrode extending through an opening into the tube is located between the venturi section and the slots to ignite the flowing gases. The positioning of the electrode within the tube prevents flash-back through the air intake openings.

YET STILL ANOTHER EXAMPLE, U.S. Pat. No. 5,242, 703 to Stewart teaches a barbecue cooker for cooking meats comprising a cooker bowl, a closure for the bowl, means for supporting food in the bowl, one or more heat sources and heat emitters supported within the cavity of the cooker bowl adjacent the heat sources. Heat and temperature are defined whereby maximum efficiency and food flavor are obtained.

STILL YET ANOTHER EXAMPLE, U.S. Pat. No. 5,284, 671 to Stewart teaches a barbecue cooker for cooking meats comprising a cooker bowl, a closure for the bowl, means for supporting food in the bowl, one or more heat sources and heat emitters supported within the cavity of the cooker bowl adjacent the heat sources. Heat and temperature are defined whereby maximum efficiency and food flavor are obtained.

YET STILL ANOTHER EXAMPLE, U.S. Pat. No. 5,481, 965 to Kronman teaches a rack and screen assembly for converting gas grilles into charcoal and/or wood burning stations. The assembly is fabricated from high temperature stainless steel, so that the assembly, when heated to its cooking temperature, retains such elevated temperature for an extended period of time. The rack includes an open frame with runner legs at its lower end, that sit atop the cylindrical tubes of conventional gas grilles. Braces extend transversely across the open frame to reinforce same, and ledges are defined at the upper ends of the open frame. The perforated metal screen is inserted into the upper end of the frame until the screen rests upon the ledges. When the screen is damaged, or wears out, the damaged screen is lifted out of the frame and replaced, manually, in a simple fashion and without resort to manual tools.

FINALLY, STILL YET ANOTHER EXAMPLE, U.S. Pat. No. 5,640,896 to Stuck teaches a conveyorized charcoal cooking apparatus that comprises two sets of horizontally aligned gas-fueled burner assemblies arranged in staggered facing relation to one another, between which a food conveyor travels at a controlled speed, the lower burner assemblies beneath the conveyor having racks on which charcoal briquettes are supported to impart charcoal cooking and flavoring to the food in addition to the cooking energy emitted by the burners. Preferably, the briquettes are of the so-called reusable type having a ceramic binder holding the charcoal material together so as to achieve substantially more extended life of the briquettes in comparison to conventional charcoal.

Even though these innovations may be suitable for the specific individual purposes to which they address, however, they would not be suitable for the purposes of the present invention as hereafter described.

SUMMARY OF THE INVENTION

ACCORDINGLY, AN OBJECT of the present invention is to provide a combination gas and charcoal grill that avoids the disadvantages of the prior art.

ANOTHER OBJECT of the present invention is to provide a combination gas and charcoal grill that is simple and inexpensive to manufacture.

STILL ANOTHER OBJECT of the present invention is to provide a combination gas and charcoal grill that is simple to use.

BRIEFLY STATED, YET ANOTHER OBJECT of the present invention is to provide a combination gas and charcoal grill that includes a housing, a heat distribution element, a gas burner, and an ash pan drawer. The heat distribution element is disposed in the housing for supporting one of lava rocks and ceramic briquettes when the combination gas and charcoal grill is being used as a gas grill and for supporting charcoal briquettes when the combination gas and charcoal grill is being used as a charcoal grill. The gas burner is disposed in the housing for heating the one of the lava rocks and the ceramic briquettes when the combination gas and charcoal grill is being used as the gas grill and for initially igniting the charcoal briquettes when the combination gas and charcoal grill is being used as the charcoal grill. The ash pan drawer is replaceably mounted in the housing and is removed for heating the one of the lava rocks or the ceramic briquettes or for initially igniting the charcoal briquettes and being returned for collecting ashes generated by the charcoal briquettes and food drippings when the combination gas and charcoal grill is being used as the charcoal grill.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

DETAILED DESCRIPTION OF THE PREFERRED EMBODIMENTS

Figure 1:
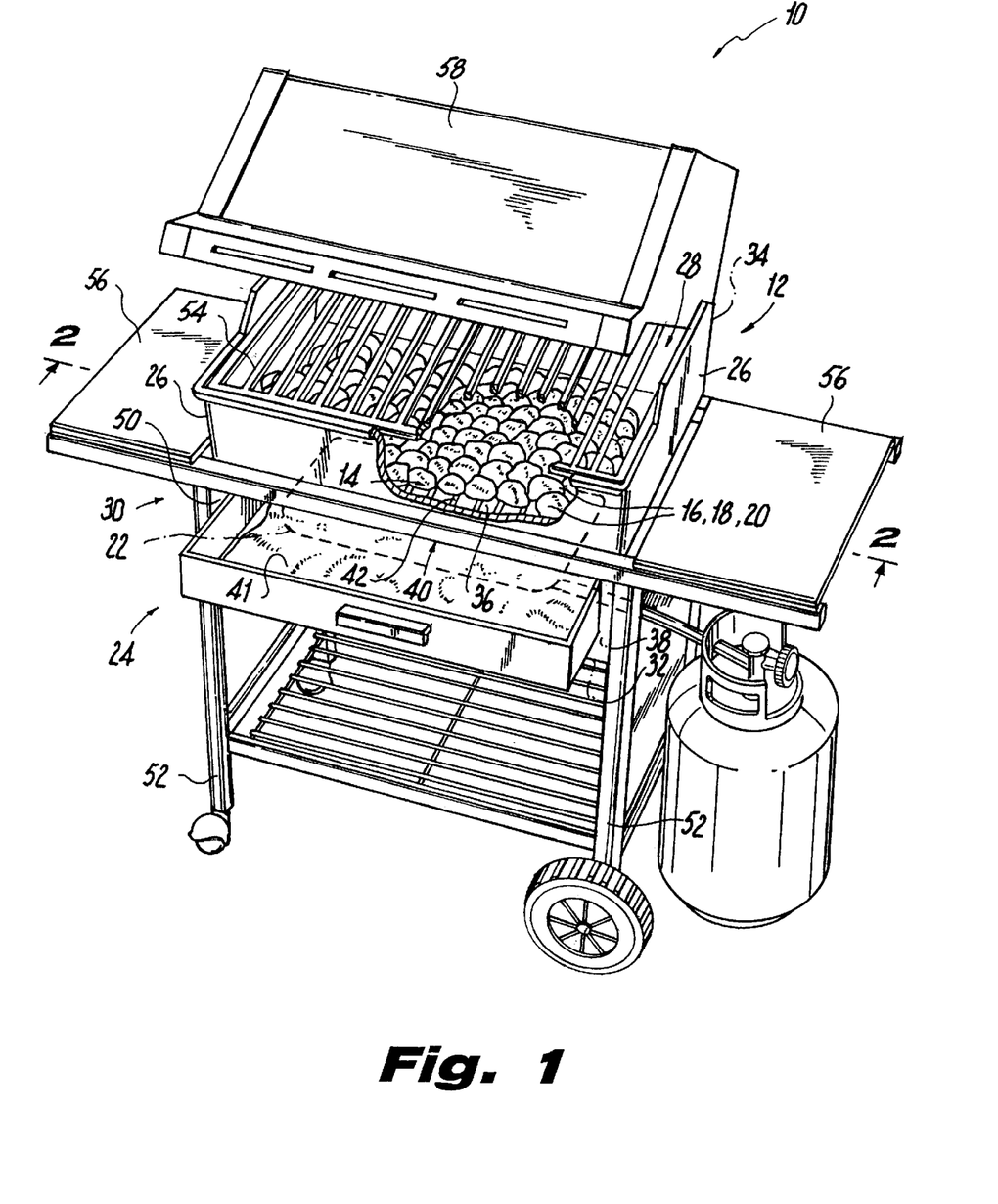
FIG. 1 is a diagrammatic perspective view of a first embodiment of the present invention.
Figure 2:
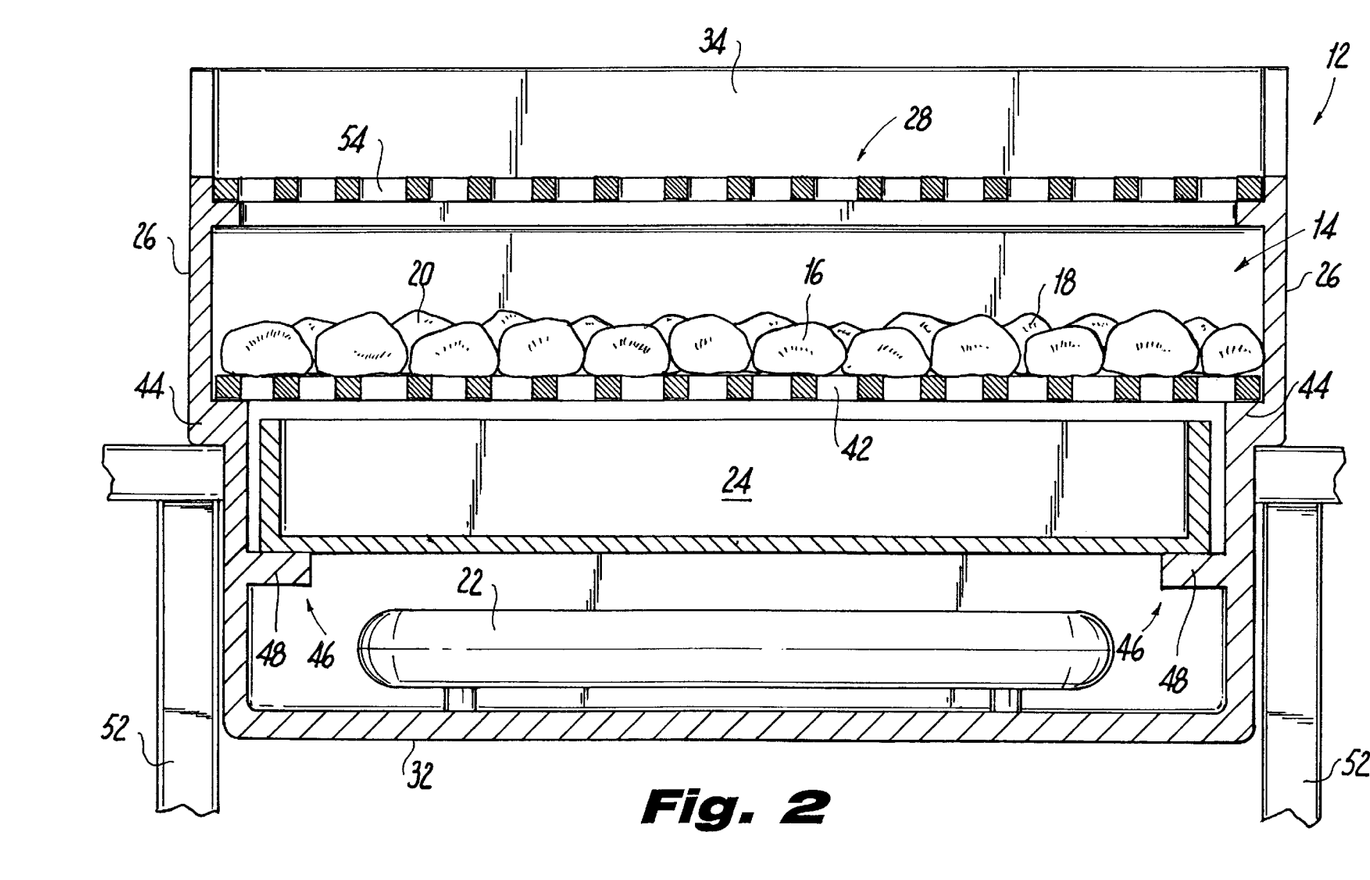
FIG. 2 is a diagrammatic cross sectional view taken on LINE 2—2 in FIG. 1.

Referring now to the figures, in which like numerals indicate like parts, and particularly to FIGS. 1 and 2, which are, respectively, a diagrammatic perspective view of a first embodiment of the present invention, and a diagrammatic cross sectional view taken on LINE 2—2 in FIG. 1, a first embodiment of the combination gas and charcoal grill of the present invention is shown generally at 10.

The combination gas and charcoal grill 10 comprises a housing 12.

The combination gas and charcoal grill 10 further comprises a heat distribution element 14 disposed in the housing 12 for supporting one of lava rocks 16 or ceramic briquettes 18 when the combination gas and charcoal grill 10 is being used as a gas grill and for supporting charcoal briquettes 20 when the combination gas and charcoal grill 10 is being used as a charcoal grill.

The combination gas and charcoal grill 10 further comprises a gas burner 22 disposed in the housing 12 for heating the one of the lava rocks 16 and the ceramic briquettes 18 when the combination gas and charcoal grill 10 is being used as the gas grill and for initially igniting the charcoal briquettes 20 when the combination gas and charcoal grill 10 is being used as the charcoal grill.

The combination gas and charcoal grill 10 further comprises an ash pan drawer 24 replaceably mounted in the housing 12 and being removed for heating the one of the lava rocks 16 and the ceramic briquettes 18 and for initially igniting the charcoal briquettes 20 and being returned for collecting ashes generated by the charcoal briquettes 20 and food drippings when the combination gas and charcoal grill 10 is being used as the charcoal grill.

The housing 12 has a pair of side walls 26 that oppose each other, a top 28 that is open, a front 30 covered by a rotatable hinged front load panel, a bottom wall 32, and a rear wall 34.

The heat distribution element 14 communicates with the top 28 of the housing 12 and a first portion 36 of the front 30 of the housing 12 for inserting and removing the one of the lava rocks 16 or the ceramic briquettes 18 when the combination gas and charcoal grill 10 is used as a gas grill and for inserting and removing the charcoal briquettes 20 when the combination gas and charcoal grill 10 is used as a charcoal grill.

The gas burner 22 is disposed on the bottom wall 32 of the housing 12 and communicates with a second open portion 38 of the front 30 of the housing 12 and with the heat distribution element 14 for heating the one of the lava rocks 16 or the ceramic briquettes 18 when the combination gas and charcoal grill 10 is used as a gas grill and for initially igniting the charcoal briquettes 20 when the combination gas and charcoal grill 10 is used as a charcoal grill which is safe, quick, and inexpensive as opposed to using inflammable liquids which are dangerous, time consuming, and costly.

The gas burner 22 is for fueling by one of liquid propane or natural gas.

The ash pan drawer 24 is slidably mounted in the housing 12 and communicates with the heat distribution element 14 for catching ashes generated by the charcoal briquettes 20 and for helping avoid flare up when the combination gas and charcoal grill 10 is used as a charcoal grill and communicates with and is accessible from a third open portion 40 of the front 30 of the housing 12 for insertion and removal.

The ash pan drawer 24 may be lined with aluminum foil 41 for folding the ashes after cooking has been completed and the charcoal briquettes 20 fully burnt out for easy disposal thereof.

The heat distribution element 14 comprises a fire grate 42 that extends horizontally between the pair of side walls 26 of the housing 12, below the top 28 of the housing 12, and replaceably rests on first supports 44 and is removable.

The ash pan drawer 24 is a shallow pan that extends horizontally between the pair of side walls 26 of the housing 12, below the heat distribution element 14 and slidably rests on second supports 46.

The first supports 44 extend, respectively, along the pair of side walls 26 of the housing 12.

The second supports 46 comprise runners 48 that extend, respectively, along the pair of side walls 26 of the housing 12.

The housing 12 further has a closure panel 50 that is disposed in the front 30 of the housing 12, and extends between the pair of side walls 26 of the housing 12, and is disposed between the ash pan drawer 24 and the gas burner 22.

The housing 12 further has legs 52 that depend from the bottom wall 32 of the housing 12.

The combination gas and charcoal grill 10 further comprises a cooking grate 54 replaceably closing the top 28 of the housing 12 and communicating with the heat distribution element 14.

The combination gas and charcoal grill 10 further comprises a pair of side shelves 56 extending horizontally outwardly, respectively, from the pair of side walls 26 of the housing 12, in substantial alignment with the top 28 of the housing 12.

The combination gas and charcoal grill 10 further comprises a hood 58 pivotally mounted to the rear wall 34 of the housing 12 and having a closed position where it encloses the cooking grate 54 and an open position where it allows access to the cooking grate 54.

Figure 3:
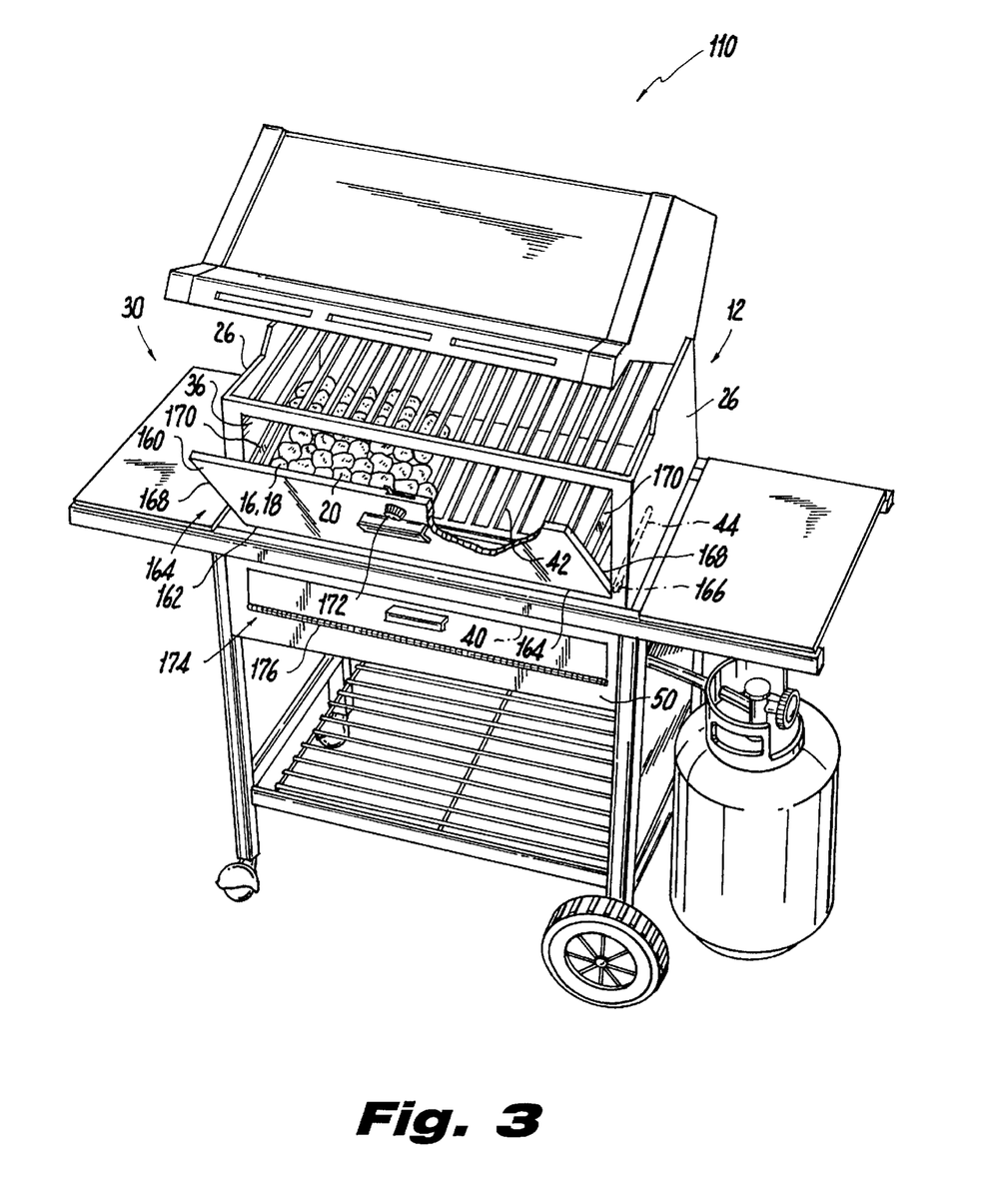
FIG. 3 is a diagrammatic perspective view of a second embodiment of the present invention.

The configuration of a second embodiment of the combination gas and charcoal grill 110 can best be seen in FIG. 3, which is a diagrammatic perspective view of a second embodiment of the present invention, and as such, will be discussed with reference thereto.

The combination gas and charcoal grill 110 is similar to the combination gas and charcoal grill 10, with the addition of a first door 160 that has a bottom 162 with ends 164 that are hingedly attached, by rotating hinges 166, respectively, to the first supports 44 and selectively closes the first open portion 36 of the front 30 of the housing 12. The door 160 may be rotated from a closed vertical position to an open position ninety degrees from said closed position so that the door lies in a horizontal plane.

The fire grate 42 may be operatively connected to the first door 160 for movement therewith.

The first door 160 further has side edges 168 with a pair of glide supports 170 extending rearwardly therefrom and slidably engage, respectively, the pair of side walls 26 of the housing 12, and as the first door 160 is opened, the fire grate 42, if operatively connected thereto, moves out from the housing 12 with the first door 160 for front loading and unloading of the one of the lava rocks 16 and the ceramic briquettes 18 when the combination gas and charcoal grill 110 is used as a gas grill and the charcoal briquettes 20 when the combination gas and charcoal grill 110 is used as a charcoal grill.

The first door 160 is variably openable for venting excess heat while cooking. In this manner, the door may be selectively opened and closed incrementally as desired to control the heating contained within the unit. In this way, the user can selectively and finitely control the temperature of the grill to prevent overcooking or burning.

The first door 160 further has a safety lock 172 thereon that selectively engages with the housing 12 and prevents unauthorized opening of the first door 160.

The combination gas and charcoal grill 110 further comprises a second door 174 that has a bottom 176 that is hingedly attached to the closure panel 50 of the housing 12 and selectively opens the third open portion 40 of the front 30 of the housing 12 so as to allow selective access to the ash pan drawer 24 for removing the ashes therein generated by the charcoal briquettes 20 when the combination gas and charcoal grill 110 is used as a charcoal grill.

The first and second doors, 160 and 174 respectively, are metallic.

Figure 4:
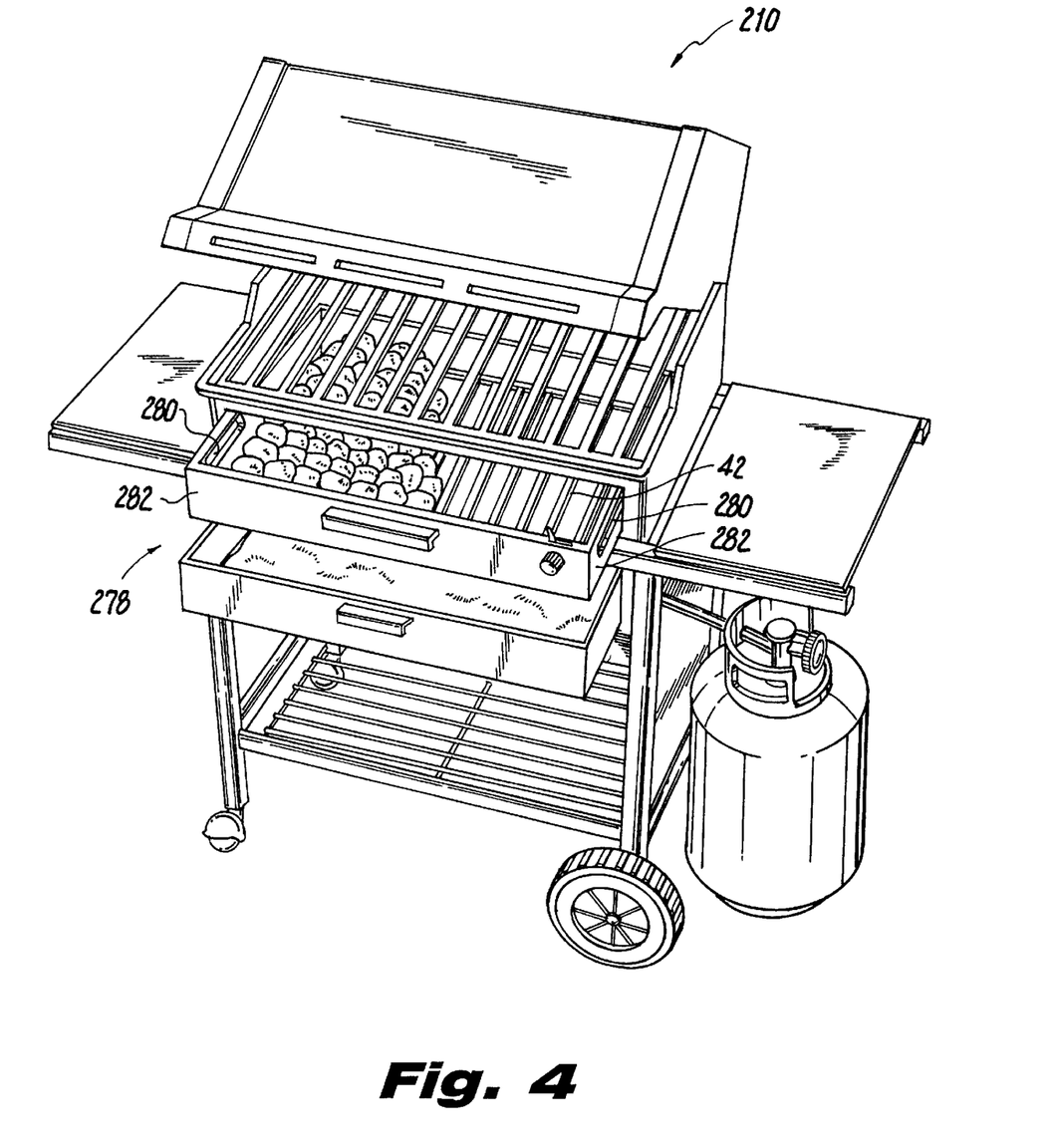
FIG. 4 is a diagrammatic perspective view of a third embodiment of the present invention.

The configuration of a third embodiment of the combination gas and charcoal grill 210 can best be seen in FIG. 4, which is a diagrammatic perspective view of a third embodiment of the present invention, and as such, will be discussed with reference thereto.

The combination gas and charcoal grill 210 is similar to the combination gas and charcoal grill 10, with the addition of a fire grate pan 278 having a side, front and back panels and an open body that replaceably supports the fire grate 42 and is slidably mounted on the first supports 44 for selective removal therefrom when the heat distribution element 14 requires removal.

The fire grate pan 278 is provided with a pair of cut out handles 280 on the side walls 282 of the fire grate pan 278 that facilitate insertion and removal of the fire grate pan 278.

Figure 5A:
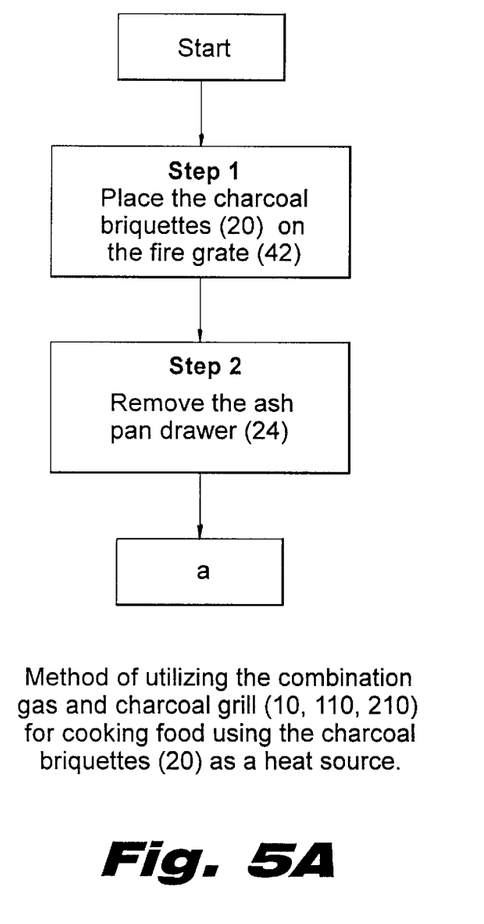
FIGS. 5A–5C are a block diagram of a method of utilizing a combination gas and charcoal grill for cooking food using charcoal briquettes as a heat source.
Figure 5B:
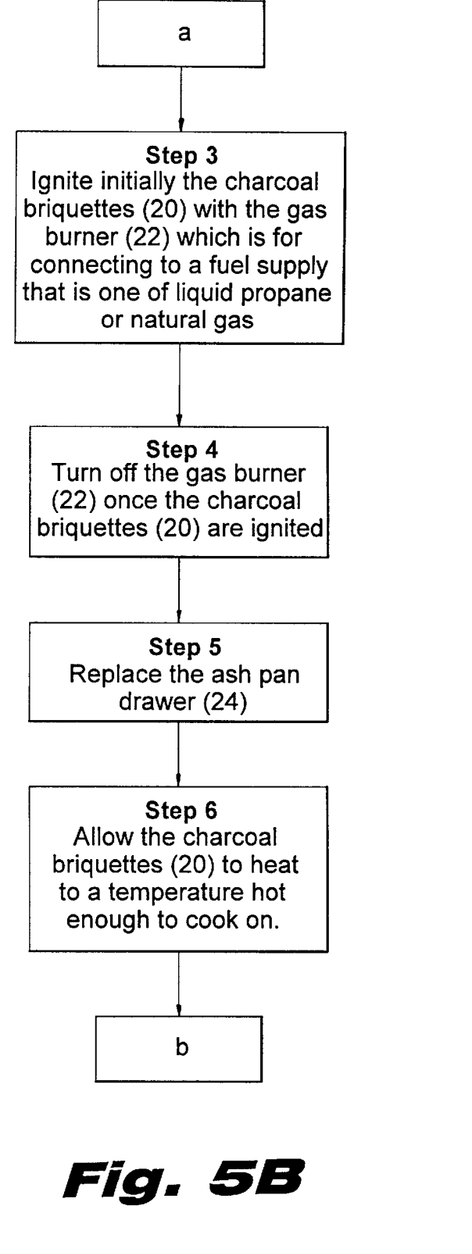
Figure 5C:
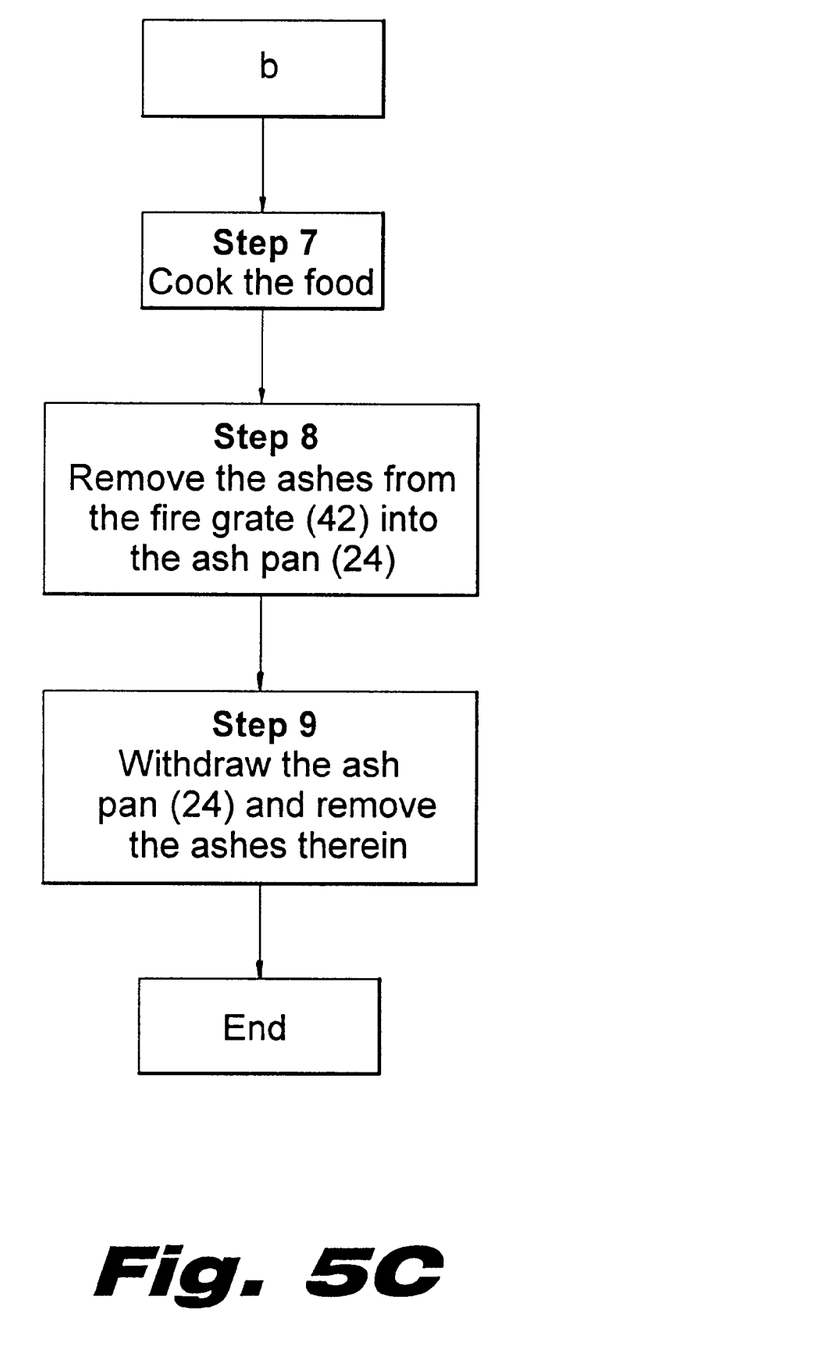

A method of utilizing the combination gas and charcoal grill 10, 110, 210 for cooking food using the charcoal briquettes 20 as a heat source can best be seen in FIGS. 5A–5C, which are a block diagram of a method of utilizing a combination gas and charcoal grill for cooking food using charcoal briquettes as a heat source, and as such, will be discussed with reference thereto.

STEP 1: Place the charcoal briquettes 20 on the fire grate 42.
STEP 2: Remove the ash pan drawer 24.
STEP 3: Ignite initially the charcoal briquettes 20 with the gas burner 22 which is for connecting to a fuel supply that is one of liquid propane and natural gas.
STEP 4: Turn off the gas burner 22 once the charcoal briquettes 20 are ignited, which should take only several minutes.
STEP 5: Reinstall the ash pan drawer 24.
STEP 6: Allow several minutes for the charcoal briquettes 20 to be hot enough to cook on.
STEP 7: Cook the food.
STEP 8: Remove any ashes remaining as residue on the fire grate 42 by brushing them into the ashpan 24 below.
STEP 9: Withdraw the ash pan drawer 24 and remove ashes therein.

Figure 6:
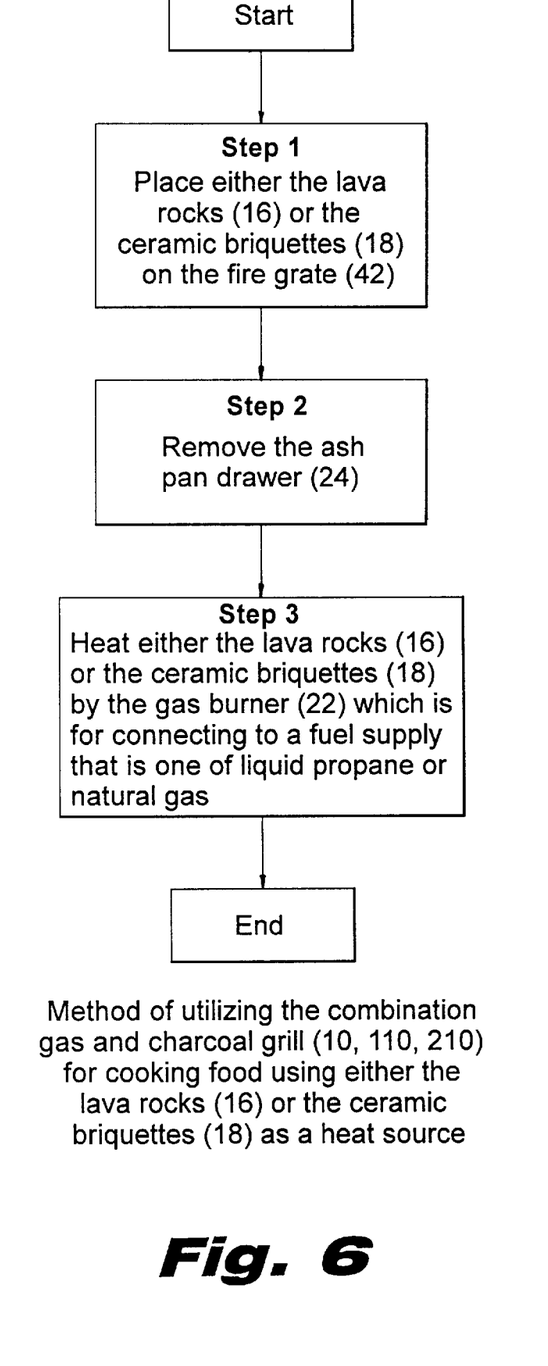
FIG. 6 is a block diagram of a method of utilizing a combination gas and charcoal grill for cooking food using one of lava rocks and ceramic briquettes as a heat source.

A method of utilizing the combination gas and charcoal grill 10, 110, 210 for cooking food using one of the lava rocks 16 and the ceramic briquettes 18 as a heat source can best be seen in FIG. 6, which is a block diagram of a method of utilizing a combination gas and charcoal grill for cooking food using one of lava rocks and ceramic briquettes as a heat source, and as such, will be discussed with reference thereto.

STEP 1: Place the one of the lava rocks 16 and the ceramic briquettes 18 on the fire grate 42.
STEP 2: Remove the ash pan drawer 24 and close the ash pan cover panel.
STEP 3: Heat the one of the lava rocks 16 and the ceramic briquettes 18 by the gas burner 22 which is for connecting to a fuel supply that is one of liquid propane or natural gas.

It will be understood that each of the elements described above, or any combination of these elements, may also find a useful application in other types of constructions differing from the types described above.

While the invention has been illustrated and described as embodied in a combination gas and charcoal grill, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A combination gas and charcoal grill, comprising:
   a) a housing;
   b) a heat distribution element disposed in said housing for supporting one of lava rocks and ceramic briquettes when said combination gas and charcoal grill is being used as a gas grill and for supporting charcoal briquettes when said combination gas and charcoal grill is being used as a charcoal grill;
   c) a gas burner disposed in said housing for heating the one of the lava rocks and the ceramic briquettes when said combination gas and charcoal grill is being used as the gas grill and for initially igniting the charcoal briquettes when said combination gas and charcoal grill is being used as the charcoal grill; and
   d) an ash pan drawer replaceably mounted in said housing and being removed for heating the one of the lava rocks and the ceramic briquettes and for initially igniting the charcoal briquettes and being returned for collecting ashes generated by the charcoal briquettes and food drippings when the combination gas and charcoal grill is being used as the charcoal grill.

2. The combination as defined in claim 1, wherein said housing has:
   a) a pair of side walls that oppose each other;
   b) a top that is open;
   c) a front that is selectively opened;
   d) a bottom wall; and
   e) a rear wall.

3. The combination as defined in claim 2, wherein said heat distribution element communicates with said top of said housing and a first open portion of said front of said housing for inserting and removing the one of the lava rocks and the ceramic briquettes when said combination gas and charcoal grill is used as a gas grill and for inserting the charcoal briquettes when said combination gas and charcoal grill is used as a charcoal grill.

4. The combination as defined in claim 2, wherein said gas burner is disposed on said bottom wall of said housing and communicates with a second open portion of said front of said housing for lighting and for communicating with said heat distribution element for heating the one of the lava rocks and the ceramic briquettes when said combination gas and charcoal grill is used as a gas grill and for igniting the charcoal briquettes when said combination gas and charcoal grill is used as a charcoal grill which is safe, quick, clean and inexpensive as opposed to using inflammable liquids which are dangerous, time consuming, and costly.

5. The combination as defined in claim 2, wherein said ash pan drawer is slidably mounted in said housing and communicates with said heat distribution element for catching ashes generated by the charcoal briquettes and for helping avoid flare up when said combination gas and charcoal grill is used as a charcoal grill and communicates with and is accessible from a third open portion of said front of said housing for insertion and removal of the charcoal briquettes.

6. The combination as defined in claim 3, wherein said heat distribution element comprises a fire grate that extends horizontally between said pair of side walls of said housing, below said top of said housing, and replaceably rests on first supports.

7. The combination as defined in claim 2, wherein said ash pan drawer is a shallow pan that extends horizontally between said pair of side walls of said housing, below said heat distribution element and slidably rests on second supports.

8. The combination as defined in claim 6, wherein said first supports extend, respectively, along said pair of side walls of said housing.

9. The combination as defined in claim 7, wherein said second supports comprise runners that extend, respectively, along said pair of side walls of said housing.

10. The combination as defined in claim 5, wherein said housing further has a closure panel that is disposed in said front of said housing, and extends between said pair of side walls of said housing, and is disposed between said ash pan drawer and said gas burner.

11. The combination as defined in claim 2, wherein said housing further has legs that depend from said bottom wall of said housing.

12. The combination as defined in claim 2; further comprising a cooking grate replaceably closing said top of said housing and communicating with said heat distribution element.

13. The combination as defined in claim 2; further comprising a pair of side shelves extending horizontally outwardly, respectively, from said pair of side walls of said housing, in substantial alignment with said top of said housing.

14. The combination as defined in claim 12; further comprising a hood pivotally mounted to said rear wall of said housing and having a closed position where it encloses said cooking grate and an open position where it allows access to said cooking grate.

15. The combination as defined in claim 6; further comprising a first door that has a bottom with ends that are hingedly attached, by rotating hinges, respectively, to said first supports and selectively closes said first open portion of said front of said housing.

16. The combination as defined in claim 15, wherein said first door is incrementally openable to permit the venting of heat from the housing.

17. The combination as defined in claim 16, wherein said first door further has side edges with a pair of glide supports extending rearwardly therefrom and slidably engaging, receptively, said pair of side walls of said housing, and as said first door is opened, said fire grate moves out from said housing with said first door for front loading and unloading of the one of the lava rocks and the ceramic briquettes when said combination gas and charcoal grill is used as a gas grill and the charcoal briquettes when said combination gas and charcoal grill is used as a charcoal grill; said first door is variably openable for venting excess heat while cooking.

18. The combination as defined in claim 15, wherein said first door further has a safety lock thereon that selectively engages with said housing and prevents unauthorized opening of said first door.

19. The combination as defined in claim 10; further comprising a second door that has a bottom that is hingedly attached to said closure panel of said housing and selectively opens said third open portion of said front of said housing so as to allow selective access to said ash pan drawer for removing the ashes therein generated by the charcoal briquettes when said combination gas and charcoal grill is used as a charcoal grill.

20. The combination as defined in claim 19, wherein said second door is metallic.

21. The combination as defined in claim 6, wherein said heat distribution element further comprises a removable fire grate pan that is slidably mounted on said first supports for selective removal therefrom when the heat distribution element requires removal.

22. The combination as defined in claim 21, wherein said fire grate pan has a pair of handles that extend upwardly from opposing side walls of said fire grate pan that facilitate insertion and removal of said fire grate pan.

23. The combination as defined in claim 1, wherein said ash pan drawer is lined with aluminum foil for folding the ashes after cooking has been completed and the charcoal briquettes fully burnt out for easy and clean disposal thereof.

24. The combination as defined in claim 1, wherein said gas burner is for fueling by one of liquid propane and natural gas.

25. A method of utilizing a combination gas and charcoal grill for cooking food using charcoal briquettes as a heat source, wherein said combination gas and charcoal grill has a housing, a heat distribution element disposed in said housing and having a fire grate for supporting the charcoal briquettes, a gas burner disposed in said housing for initially igniting the charcoal briquettes, and an ash pan drawer replaceably mounted in said housing and being removed for initially igniting the charcoal briquettes and being returned after said ignition for collecting ashes generated by the charcoal briquettes and food drippings, said method comprising the steps of:

a) placing the charcoal briquettes on said fire grate;

b) removing said ash pan drawer;

c) igniting initially the charcoal briquettes with said gas burner which is for connecting to a fuel supply that is one of liquid propane and natural gas;

d) turning off said gas burner once the charcoal briquettes are ignited; and e) reinstalling said ash pan drawer.

26. The method as defined in claim 25; further comprising the steps of:

f) allowing the charcoal briquettes to be heat to a temperature hot enough to cook with;

g) cooking the food;

h) removing the ashes generated by the charcoal from said fire grate to the ashpan below; and i) withdrawing said ash pan drawer and removing ashes therefrom and disposing of said ashes.

27. A method of utilizing a combination gas and charcoal grill for cooking food using one of lava rocks and ceramic briquettes as a heat source, wherein said combination gas and charcoal grill has a housing, a heat distribution element disposed in said housing for supporting the one of the lava rocks and the ceramic briquettes, a gas burner disposed in said housing for heating the one of the lava rocks and the ceramic briquettes, and an ash pan drawer replaceably mounted in said housing and being removed for heating the one of the lava rocks and the ceramic briquettes, said method comprising the steps of:

a) placing the one of the lava rocks and the ceramic briquettes on said fire grate;

b) removing said ash pan drawer; and c) heating the one of the lava rocks and the ceramic briquettes by said gas burner which is for connecting to a fuel supply that is one of liquid propane and natural gas.

* * * * *